April 23, 1940.  B. C. PLACE  2,198,290
FASTENER
Filed March 7, 1938
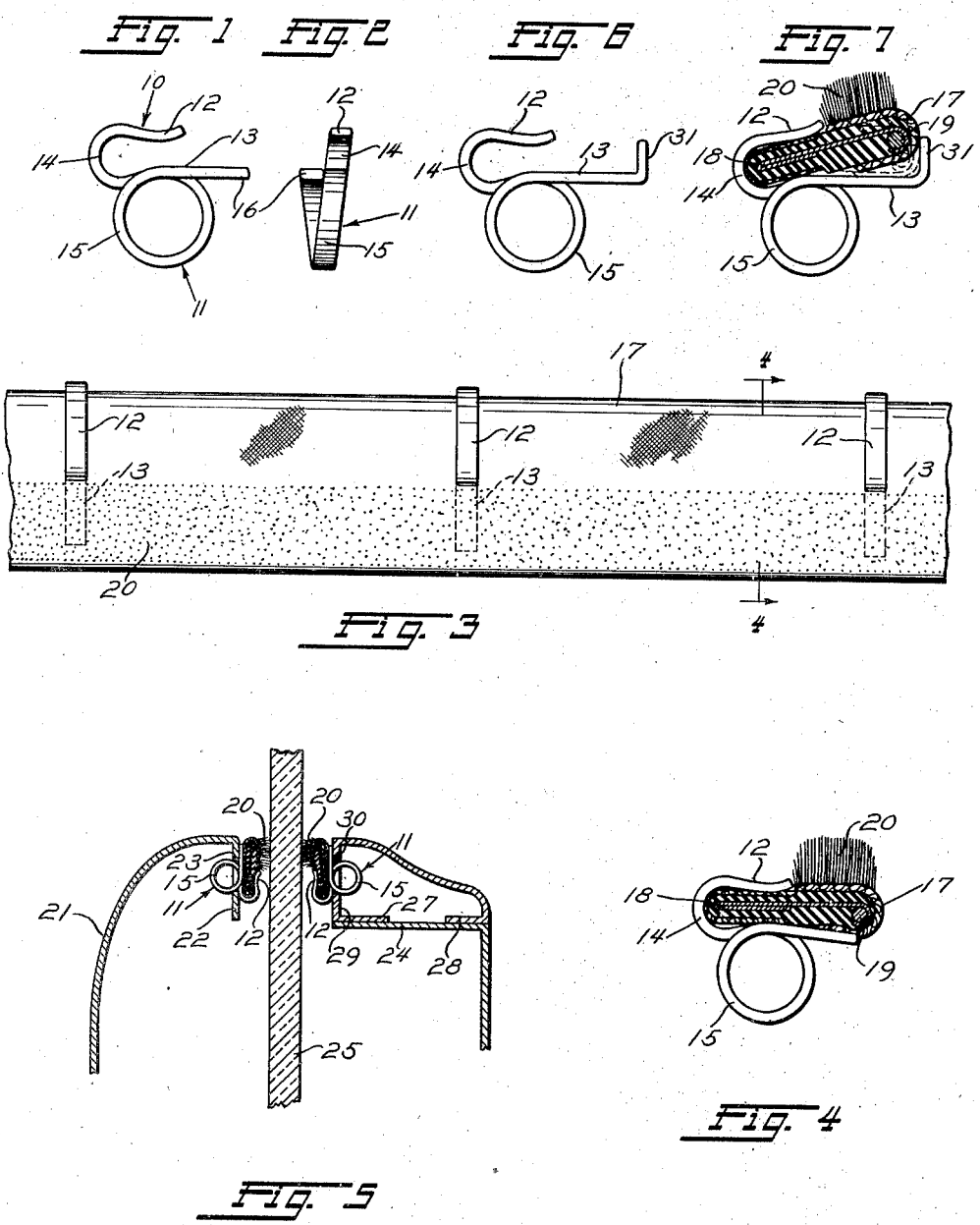
Inventor
Bion C. Place
By Strauch & Hoffman
Attorneys Patented Apr. 23, 1940

2,198,290

UNITED STATES PATENT OFFICE 2,198,290

FASTENER

Bion C. Place, Detroit, Mich., assignor of one-half to George E. Gagnier, Detroit, Mich.

Application March 7, 1938, Serial No. 194,494

9 Claims. (Cl. 20—69)

The present invention relates to spring stud fasteners of the type intended to secure finish, cushioning, or like strips to sheet metal structures provided with perforations to receive the stud parts of the fasteners. More particularly, the invention is concerned with an improved one-piece wire spring stud fastener designed especially for the purpose of securing cushioning strips around the window openings in automobile or like bodies.

The principal purpose of the present invention is to provide an improved spring stud fastener especially adapted to be very conveniently secured to cushioning strips, and capable of ready insertion in perforations in a metal structure in such manner that the strip is fixedly secured to said structure by the spring stud fastener, although the fastener is of such simple form that it may be produced at an extremely low cost.

Another object of the invention is to provide a spring stud fastener having a head part especially formed to firmly grip a strip with which it is engaged, and a stud part that is effective to provide unusual holding power, although the stud part is capable of insertion without the exercise of considerable force.

Still another object of the invention is to provide an improved one-piece wire spring stud fastener in which the head of the fastener partakes of a hook-like form while the stud part of the fastener consists simply in a single, preferably circular, loop of wire depending centrally from one of the arms of the hook-like head.

A still further object of the invention is to provide a spring stud fastener constructed of wire and in which the stud part of the fastener consists in a single convolution of a wire coil.

And still another object of the invention is to provide a spring stud fastener of unusual holding power but possessing a very short stud part and a compact head part requiring only a short piece of wire in its construction.

A still further object of the invention is to provide a spring stud fastener having a hook-like head including an upstanding projection from one of the arms of the hook-like head that is effective to retain a strip, such as a cushioning strip for example, within the hook in such a way that the strip cannot be shifted longitudinally of the hook arms.

A still further object of the invention is to provide a spring stud fastener having a hook-like head including two parallel arms, one of which is substantially shorter than the other, and in which the stud part consists of a circular loop depending from the central portion of the longer arm of the hook-like head.

A still further object of the invention is to provide a novel association of spring stud fasteners, and a cushioning strip of conventional form, in which the fastener is constructed to adequately grip the strip and prevent its disengagement from the fasteners.

A still further object of the invention consists in providing an improved combination of a metal support, cushioning strip, and fastener associated in such a manner that the fastener firmly secures the strip to the structure without substantial penetration of the nap part of the strip intended to contact with the glass adjustably mounted in the opening in the structure to which the strip is secured.

Still further objects of the invention will appear as the description thereof proceeds with reference to the accompanying drawing in which:

Figure 1 is a side view of a spring stud fastener including the present invention;

Figure 2 is an edge elevational view of the fastener of Figure 1 as seen from the right of said figure;

Figure 3 is a plan view of a fragment of a cushioning strip having a number of fasteners applied to the strip in a preferred manner;

Figure 4 is a fragmental sectional view taken on the plane indicated by the line 4—4 in Figure 3 looking in the direction of the arrows;

Figure 5 is a fragmental sectional view showing several cushioning strips secured to a typical metal structure in proper position to a pane of glass adjustably mounted in said structure in a manner well understood in the automobile art;

Figure 6 is a side elevational view of a modified form of spring stud fastener;

Fig. 7 is a sectional view showing the mode of applying a cushioning strip to the fastener of Figure 6, the final position of the strip in association with the fastener being illustrated in dotted lines in this figure.

Like reference characters indicate like parts throughout the several views.

Referring to Figures 1 and 2 of the drawing, the fastener of the present drawing consists of a head part 10 and a shank part 11. The head part 10 is of hook-like formation, or a formation resembling the letter C, and includes two arms 12 and 13 which are substantially parallel to each other, the arm 13 being substantially longer than the arm 12. Said arms are connected by a portion 14 constituting the bight of the hook. The shank part 11 of the fastener includes simply a preferably circular loop 15, which depends from the mid-portion of the arm 13 of the head.

The fastener just described is constructed from a single piece of wire by bending one end of the wire into a generally C-shaped form and bending the mid-portion of the wire into a loop constituting a single convolution of a coil, the other end 16 of the wire being then bent to form a straight portion forming a laterally offset continuation of the inner arm of the hook-like head. It will be observed that the arm 13 is tangent to the loop 15 producing two sharp angles between the several portions of said arm 13 and the loop for a purpose which will presently be referred to.

The fastener just described may be constructed from a small piece of wire which is preferably tempered after it is bent into the form illustrated in Figures 1 and 2.

Such a fastener as just described is peculiarly useful in securing cushioning strips around the openings in metal doors or other portions of automobile or like bodies. When used for this purpose the fastener is engaged with the cushioning strip in the manner illustrated in Figures 3 and 4 of the drawing. Referring to these figures the cushioning strip includes a body 17, that may or may not include metal reinforcements 18 and 19, extending longitudinally thereof which body is covered with fabric, a portion of which has a substantial nap such as indicated at 20. Cushioning strips of this character are well known in the art and per se constitute no part of the present invention. The cushioning strips may assume any other desirable form. In that illustrated, the nap 20 extends throughout a substantial portion of one side only of the cushioning strip this being the type of cushioning strip in wide use in automobile bodies at present.

The fasteners of the present invention are applied to the cushioning strip 17 by hooking the fasteners on the strip from the edge thereof that is not provided with the nap 20, as clearly shown in Figure 3. The arms 12 of the fasteners lap a substantial portion of one side of the strip up to the nap 20, while the longer arms 13 underlie the strips and preferably extend substantially to the edge thereof remote from that from which the fasteners are hooked on the strips. After the fasteners have been applied the loop constituting the stud parts thereof are disposed substantially centrally of the strip.

Referring to Figure 5 of the drawing, a typical way of using such a strip with fasteners applied thereto in the manner illustrated in Figures 3 and 4 is shown. 21 illustrates the outside of a part of an automobile, such as a part of the outer automobile body for example, having an inturned flange 22 provided with a perforation 23 for the reception of the stud part of the fastener that secures the cushioning strip 17 to this metal part. 24 illustrates the sheet metal part of the inside of an automobile body that surrounds the opening in which a glass pane 25 is adjustably mounted. The glass pane 25 is retained in the opening, provided for it, by a garnish molding 26 of hollow formation and including flanges 27 and 28 which, when the molding is secured in place, rest upon the metal structure 24. The garnish molding also includes a wall 29 provided with fastener receiving perforations 30.

The cushioning strip is secured to the edges of the metal structure defining the opening in which the pane of glass 25 is mounted, and in the use of the present invention the stud parts 11 are sprung in the openings 23 and 30 in securing the cushioning strips in position at opposite sides of the pane of glass 25.

It will be observed from Figure 5 that the hooks of the head parts of the fasteners open toward the window opening and inasmuch as the shorter arm 12 of each of the fasteners does not penetrate the nap 20 of the strips, the said arms are spaced from the pane of glass and are out of contact with the glass. The body of the strip, however, is firmly gripped between the arms 12 and 13 which are spaced so that it is necessary to pry the arms apart somewhat against the inherent resilience of the wire from which the fastener is constructed to insert the strips therebetween thus insuring a firm gripping of the cushioning strips between the fastener arms.

The stud parts of the fasteners are sprung into the perforations 23 and 30. In view of the fact that the width of the loops 15, constituting said stud parts, exceeds the diameter of said openings, it is necessary to contract the stud parts in entering the single convolution of the coil in the perforation provided for its reception. The contraction of the loop is effected either by elongating the loop or by movement of the two ends of the wire during such contraction. After the stud parts have been entered in the perforation the loop expands forcing the edges of the metal structure into the sharp angles provided between the loop and the portions of the arm 13, which are tangent to the loop, and which have already been referred to. A stud part constructed as just described possesses unusual tenacity or holding power, though it is capable of being sprung into the perforation in the metal structure, provided to receive it, without the exercise of much force, the improved holding effect being due to the sharp angle provided by virtue of the fact that the loop is substantially circular in form with the arm 13 substantially tangent to the loop.

It will be appreciated that the fastener consists simply of a properly bent, relatively small piece of wire having no projections, that could possibly contact with the glass, and that the stud part projects beyond the inner surface of the metal structure to which the cushioning strip is secured only a small distance. The fastener may, accordingly, be constructed at a low cost, though it is designed to grip and firmly hold the cushioning strip and secure it to the metal structure with exceptionally satisfactory holding power.

Preferably the fastener is constructed from flat wire, the bends in the flat wire being made in directions in which a flat wire can most readily be bent. This arrangement provides a greater area of contact between the arms of the head part of the fastener and the cushioning strip and yet maintains the height of the head of the fastener at a minimum.

If desired the fastener of the present invention may be constructed in the form illustrated in Figure 6 in which the straight portion 13 of the longer arm of the head is provided with the upstanding right angular projections 31, which serves to partially close the opening in the hook-like head. The fastener of this form of the invention is in other respects exactly the same as that illustrated in Figures 1 and 2.

In the use of the fastener of Figure 6, the body 17 of cushioning strips is inserted between the arms 12 and 13 of the fastener as illustrated in Figure 7, that is, by inclining the body, which is relatively stiff, and forcing it between the arms 12 and 13, the arm 12 flexing sufficiently to enable this to be done. After the fastener is completely inserted, the arm 12 resumes its original position and the outer edge of the body 17 is engaged in back of the upstanding portion 31, cooperating with the bight 14 of the hook to positively prevent shifting of the strip lengthwise of the arms of the hook of the head part of the fastener. In other respects the fastener of Figure 6 is utilized in the manner already described.

While the fasteners may first be assembled with respect to the cushioning strip, as illustrated in Figure 3, it will be understood that in appropriate situations, particularly when it is impractical to do this, that the fasteners may first be applied to the metal structure by snapping the stud parts thereof in the openings provided therein, and that after this has been done the body of the cushioning strip may be engaged between the arms of the hooks of the head parts of the fasteners.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flat wire spring stud fastener, consisting of a stud part in the form of a single convolution of a coil, and a head part including two substantially parallel arms, one of which is tangent to said convolution and the other of which is spaced from the latter radially of said coil, the major dimension of said flat wire extending transversely of the plane of said convolution.

2. In combination, a metallic support having a fastener receiving perforation, a cushioning strip overlying said support and having a body and a nap portion at a part of one side of said body, and a wire stud fastener having a head part including two arms gripping the sides of said body laterally of said nap portion, and a stud part in the form of a substantially circular loop depending from one arm of said head part, said loop terminating in a straight portion tangent to the loop and disposed in the same plane as said last named arm and in contact with said cushioning strip, said loop being sprung in said perforation so that said support is gripped in the sharp angles between the loop and said last named arm and said straight portion.

3. In combination, a cushioning strip having a body and a nap portion at a part of one side of said body, and a wire fastener associated with said strip and consisting of a head part comprising a long arm and a short parallel arm between which said strip is gripped with the short arm lapping said strip but not substantially penetrating said nap and the long arm underlying said strip substantially throughout its entire width, and a stud part depending from said long arm substantially centrally of the length thereof.

4. A one-piece wire spring stud fastener comprising a head part that consists of two parallel arms one of which is shorter than and disposed above the other, and a stud part depending centrally from the longer arm and consisting in a circular single convolution of a coil, the ends of the piece of wire forming the ends of said arms.

5. A spring stud fastener to secure a cushioning strip to a metal structure, consisting of a head part including a pair of spaced arms shaped to grip the body of said strip between them, and a stud part depending from said head part and consisting in a single helical convolution of a coil depending from one of said arms, said convolution terminating in a portion disposed so as to form an extension of said last named arm.

6. A spring stud fastener including a hook-like head part consisting of two substantially parallel arms, one of said arms being longer than the other, a stud part in the form of a single helical loop depending from the mid-portion of said longer arm and a projection adjacent the end of said longer arm extending toward said shorter arm so as to partially close the hook formed by said arms.

7. A spring stud fastener including a head part in the form of a hook comprising two parallel arms of differing length, a stud part in the form of a complete circular loop depending from the mid-portion of one of said arms and a projection extending at right angles to one of said arms adjacent the end thereof and cooperating with the bight of the hook to retain a strip from movement in either direction along the length of said arms.

8. A spring stud fastener, comprising a head part consisting of a hook-like formation including two spaced substantially parallel arms of unequal length and a helical stud part of substantially circular form depending from the mid-portion of the longer arm, said last named arm of said hook-like formation being tangent to the circular stud part.

9. A one-piece spring stud fastener comprising a head part consisting of a pair of connected arms including the ends of said piece respectively, one of said arms being spaced above the other arm, and a stud part consisting in a single helical convolution of a coil depending from the mid-portion of said other arm.

BION C. PLACE.